(12) United States Patent
Heil et al.

(10) Patent No.: US 7,018,289 B2
(45) Date of Patent: Mar. 28, 2006

(54) LATCH ASSEMBLY FOR DAMPER

(75) Inventors: Eugene J. Heil, Marathon, WI (US); Terrance Horvat, Wausau, WI (US)

(73) Assignee: Greenheck Fan Corporation, Schofield, WI (US)

( * ) Notice: Subject to any disclaimer, the term of this patent is extended or adjusted under 35 U.S.C. 154(b) by 126 days.

(21) Appl. No.: 10/733,971

(22) Filed: Dec. 11, 2003

(65) Prior Publication Data

US 2004/0121722 A1 Jun. 24, 2004

Related U.S. Application Data

(60) Provisional application No. 60/432,421, filed on Dec. 11, 2002.

(51) Int. Cl.
*F24F 11/053* (2006.01)

(52) U.S. Cl. .......................................... 454/369; 137/74
(58) Field of Classification Search ................. 454/257, 454/369; 137/72, 74, 601.09, 385; 251/286; 126/287.5; 49/7, 8
See application file for complete search history.

(56) References Cited

U.S. PATENT DOCUMENTS

| | | | | |
|---|---|---|---|---|
| 3,571,973 A | * | 3/1971 | Roberts | 49/2 |
| 3,650,069 A | * | 3/1972 | Alley | 49/7 |
| 4,080,978 A | * | 3/1978 | McCabe | 137/79 |
| 4,193,541 A | * | 3/1980 | Scheidweiler | 236/1 G |
| 4,610,197 A | * | 9/1986 | Van Becelaere | 454/335 |
| 5,020,423 A | * | 6/1991 | Hill | 454/319 |

FOREIGN PATENT DOCUMENTS

DE 2 262 541 * 6/1974

* cited by examiner

*Primary Examiner*—Harold Joyce
(74) *Attorney, Agent, or Firm*—Quarles & Brady LLP

(57) ABSTRACT

A damper assembly is provided having at least one damper blade that operates in a normally open position. A fusible link is connected to the damper blade to maintain the damper blade in the open position against a biasing force tending to close the damper blade. The fusible link fails upon an occurrence of a predetermined condition. A damper mechanism is provided including a locking mechanism linked to the damper blade that resists opening of the damper blade when the blade has closed due to failure of the fusible link.

68 Claims, 5 Drawing Sheets

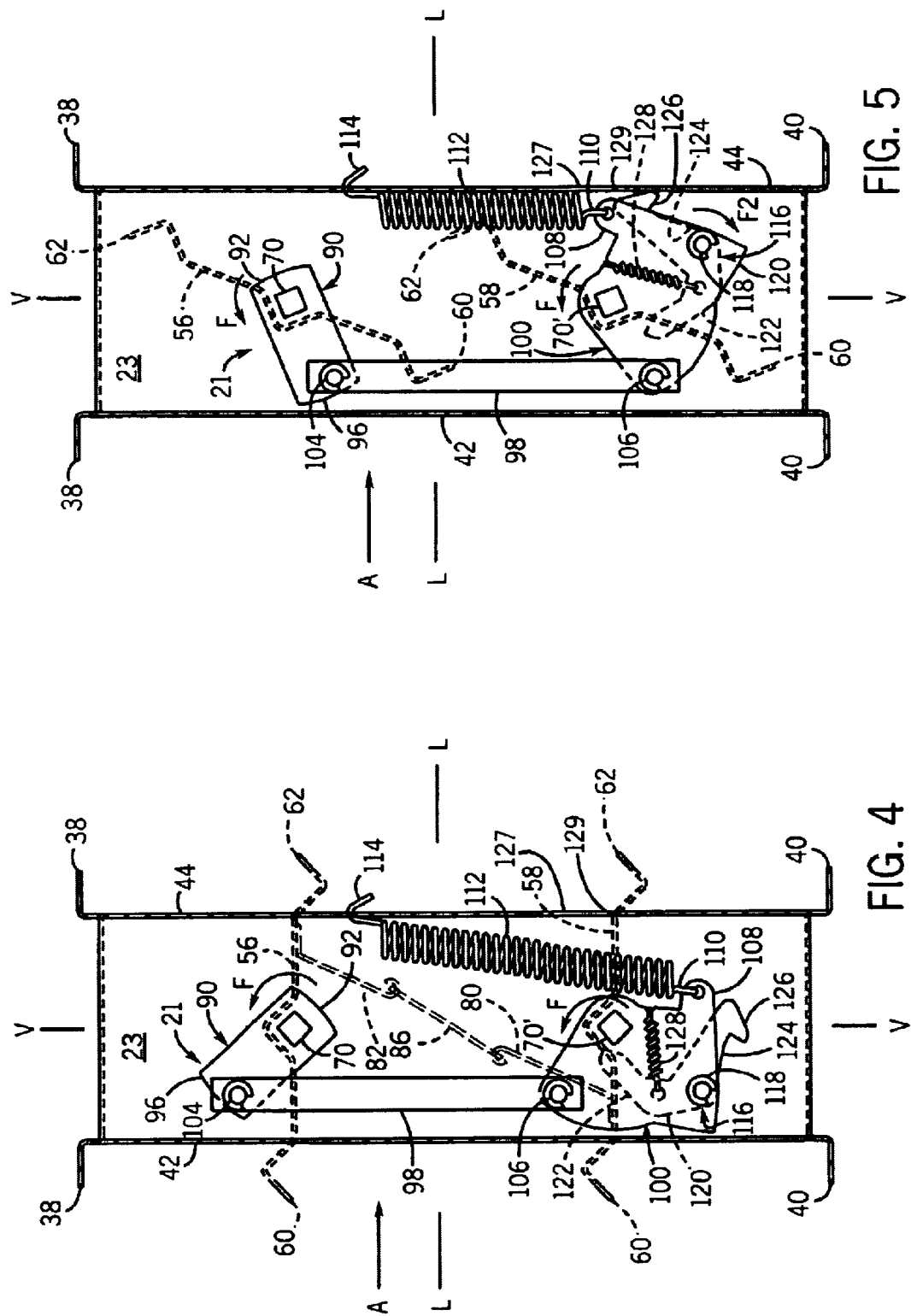

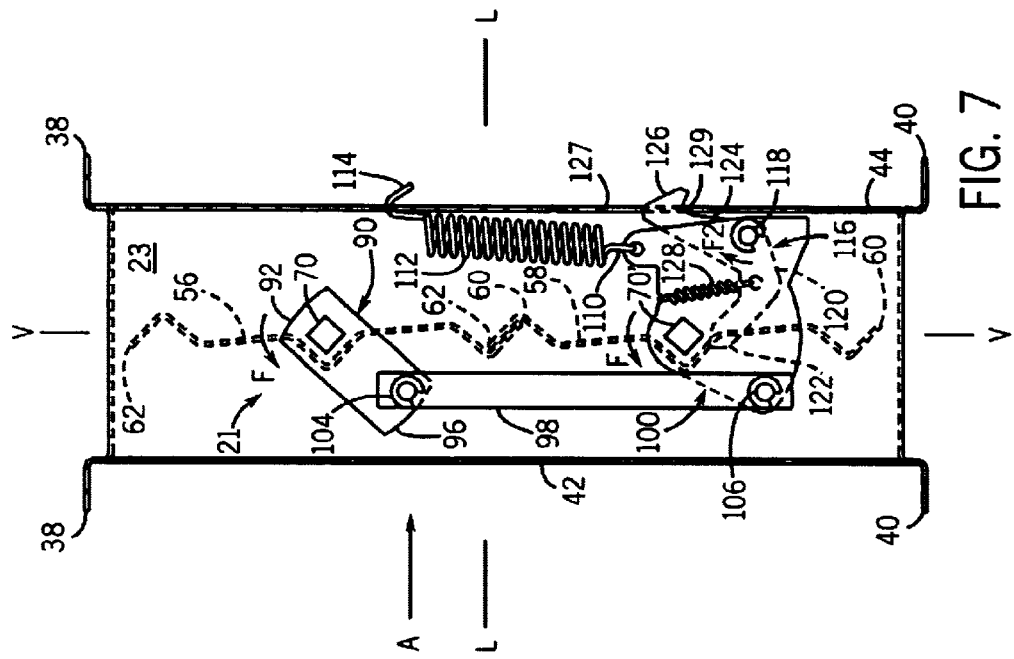
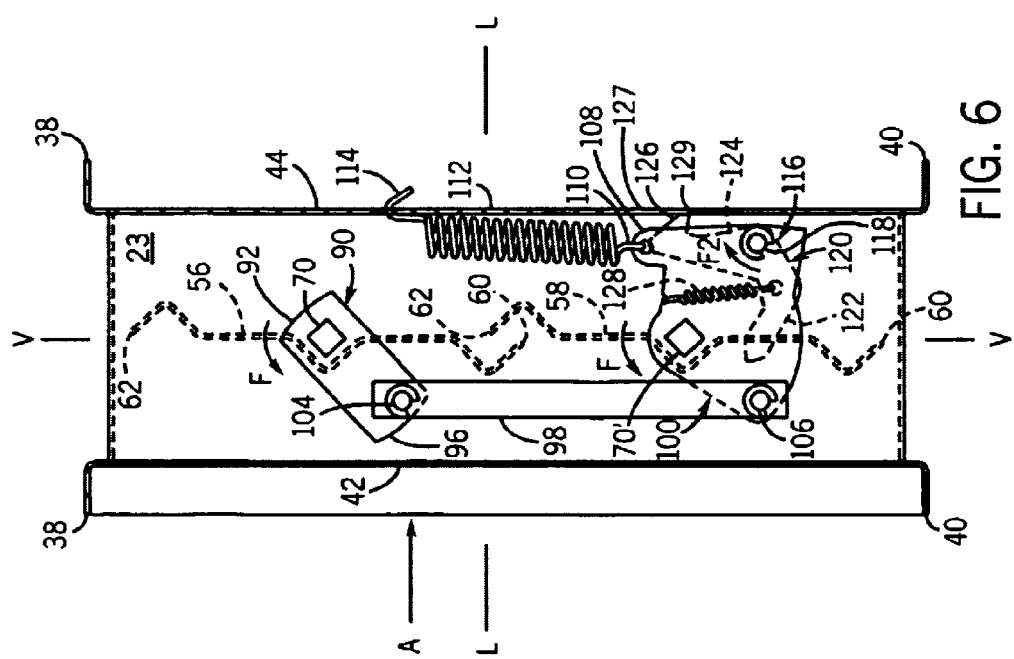

LATCH ASSEMBLY FOR DAMPER

CROSS-REFERENCE TO RELATED APPLICATIONS

This patent application claims priority to U.S. provisional application Ser. No. 60/432,421 filed Dec. 11, 2002 and entitled "Latch Assembly for Damper."

STATEMENT REGARDING FEDERALLY SPONSORED RESEARCH OR DEVELOPMENT

BACKGROUND OF THE INVENTION

The present invention relates generally to damper assemblies, and in particular, relates to a latch usable in combination with a damper that, when installed within the ductwork of a building, strengthens the seal provided by the damper blades when the damper is closed.

Building and fire codes require that dampers be placed in specified heating, ventilation, and air conditioning ducts. Dampers include a pair of damper blades that operate in a normally open position, which allows air to flow through the ductwork. The blades can close to prevent air flow through the ductwork in response to a predetermined stimulus. The stimulus can be a dramatic increase in temperature, indicating a fire or other hazardous condition, or any other event that causes the damper blades to close.

Conventional damper blades are biased towards their closed position by a spring member or the like, but held open by a fusible link or other suitable member that prevents the blades from closing under the spring force. When the fusible link fails in a predetermined manner in response to an elevation in temperature, the mechanical interference maintaining the blades in their open position is removed, and the damper closes to form a seal with the duct with respect to airflow. As a result, airflow throughout the building is minimized in response to a fire or other hazardous condition.

It should be appreciated that the ability for the damper to prevent the hazardous material or fire from spreading throughout the building depends largely on the strength of the seal between the damper blades and the ductwork when the blades are closed. A damper becomes "fire-rated" by Underwriters Laboratories if it is able to withstand the extreme temperatures for a predetermined amount of time without weakening its seal between the blades and the duct. In conventional dampers, prolonged exposure to extreme temperatures associated with heat tend to weaken the damper components and the resulting seal.

What is therefore needed is a damper assembly capable of providing an enhanced seal between the damper blades and the duct with respect to conventional damper assemblies.

BRIEF SUMMARY OF THE INVENTION

The present invention recognizes that conventional dampers can be modified to increase their strength characteristics when closed, thereby reducing the risk of spreading fire or contaminants throughout a building during a hazardous situation.

In accordance with one aspect of the invention, a damper assembly is installed in a housing of the type having a pair of side walls connected to a pair of end walls that define a conduit extending therethrough. The damper assembly is movable from an open position to a closed position to control fluid flow through the conduit. The damper assembly includes at least one damper blade operating in a normally open position.

In accordance with another aspect of the invention, a biasing member applies a force to the damper blade biasing the blade towards the closed position. In one form, the biasing member is a spring member operably connected between the blade and the housing.

In accordance with still another aspect of the invention, a retaining member is in removable mechanical communication with the damper blade to maintain the damper blade in the open position against the biasing force.

In accordance with still another aspect of the invention, a latch mechanism is provided that engages to resist counter-movement of the damper blade towards the open position once the damper blade has closed. In one form, the latch mechanism includes a latch member and a corresponding catch member, one of which in mechanical communication with the blade, the other of which in mechanical communication with the housing, wherein an interference is created between latch member and catch member to resist counter-movement of the damper blade towards the open position once the damper blade has closed.

These and other aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment also does not define the scope of the invention and reference must therefore be made to the claims for this purpose.

BRIEF DESCRIPTION OF THE DRAWINGS

Reference is hereby made to the following drawings in which like reference numerals correspond to like elements throughout, and in which:

FIG. 4 is a sectional side elevation view of the damper assembly illustrated in FIG. 1 with the blades in an open position;

FIG. 5 is a sectional side elevation view of the damper assembly illustrated in FIG. 4 but with the damper blades in a partially closed position;

FIG. 6 is a sectional side elevation view of the damper assembly illustrated in FIG. 5 but with the damper blades in a further closed position;

FIG. 7 is a sectional side elevation view of the damper assembly illustrated in FIG. 6 but with the damper blades in a fully closed position.

DETAILED DESCRIPTION OF THE PREFERRED EMBODIMENT

Figure 1:
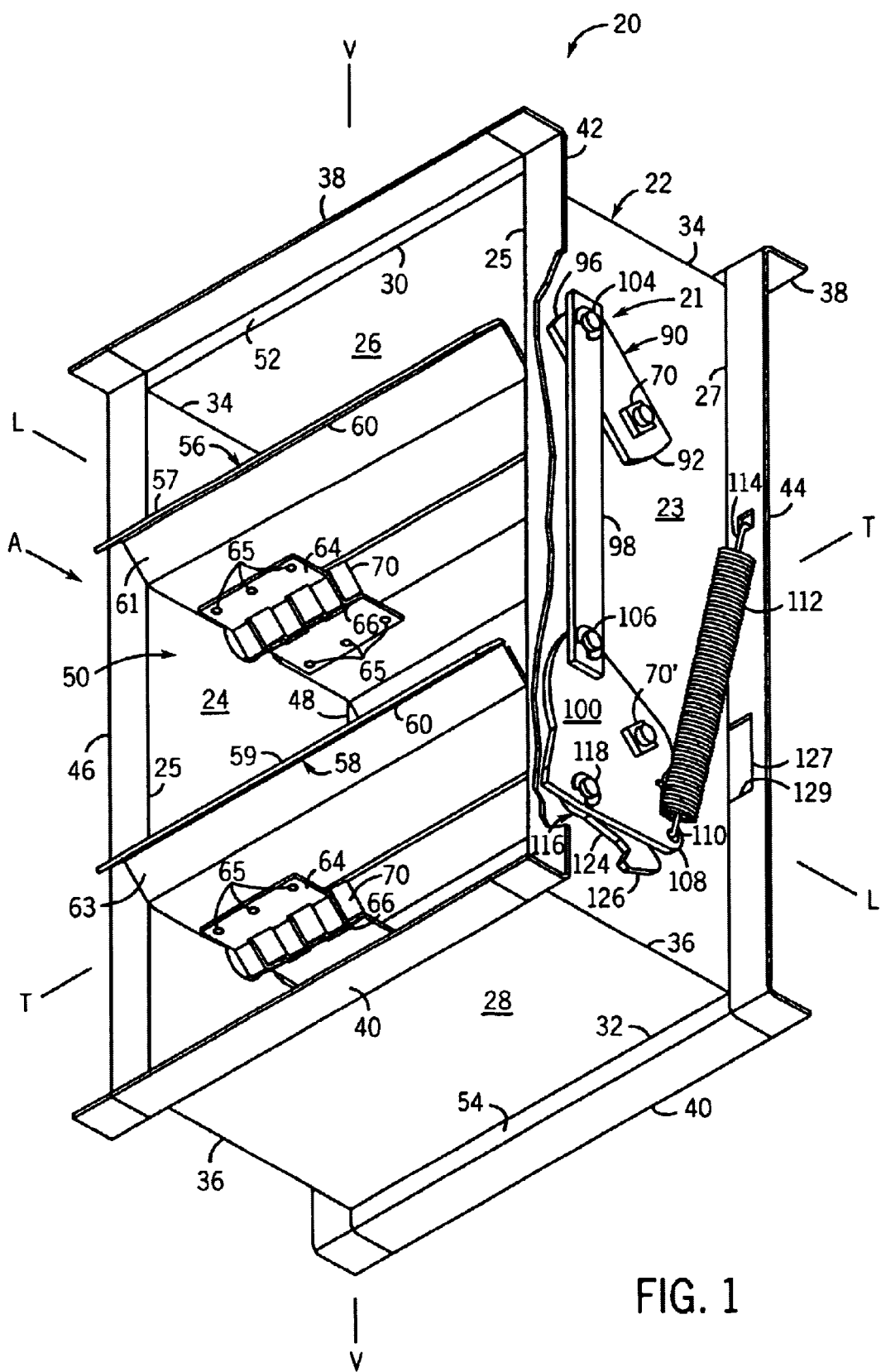
FIG. 1 is a perspective view of a damper assembly constructed in accordance with the preferred embodiment of the invention.

Referring initially to FIG. 1, a damper assembly 20 is installed in a rectangular housing 22. It should be appreciated that housing 22 can be installed in the ductwork of a building or, alternatively, that housing 22 could be integral with the ductwork. The term "housing" is thus used broadly throughout this description to define a member that supports the damper assembly 20 in the ductwork of a building, regardless of whether the housing is a separate member and fit inside the ductwork, or whether the housing is integral with the ductwork. Unless otherwise stated, the components of damper assembly 20 are preferably formed of steel, though other suitable materials could be used.

Housing 22 is defined by opposing side walls 23 and 24 that are elongated in the direction of vertical axis V—V and are connected at their upper and lower ends to opposing end walls 26 and 28, respectively. End wall 26 thus defines the upper end of damper assembly 20 while end wall 28 defines the lower end, such that end wall 26 is said to be disposed "above" end wall 28. Walls 23, 24, 26, and 28 define an internal void 50 that enables air to flow through the housing 22 (and ductwork of a building) along the direction of Arrow A.

The terms "upstream" and "downstream" are used herein with respect to the direction of airflow through the housing 22 along the direction of Arrow A. The term "longitudinal" is used throughout the description below to define a horizontal direction along axis L—L and parallel to the direction of air flow through damper assembly 20. The term "transverse" is used to define a horizontal direction along axis T—T that is orthogonal to longitudinal axis L—L and vertical axis V—V.

Side walls 23 and 24 are connected to upper end wall 26 and lower end wall 28 at corresponding longitudinally extending upper and lower edges 34 and 36, respectively. Edges 34 and 36 define the transverse boundaries of upper and lower walls 26 and 28, respectively, and further define the vertical boundaries of side walls 23 and 24. The longitudinal boundaries of end walls 26 and 28 are defined by transversely extending edges 30 and 32. The longitudinal boundaries of side walls 23 and 24 are defined by edges 25 and 27. Edge 25 defines the leading edge of the damper assembly 20 with respect to airflow, and is disposed upstream of edge 27.

A pair of vertically elongated flanges 42 and 44 extends slightly transversely outwardly from edges 25 and 27, respectively, of side wall 23. A corresponding pair of flanges 46 and 48 extend slightly transversely outwardly from edges 25 and 27, respectively, of side wall 24. Flanges 42 and 46 are disposed upstream of flanges 44 and 48. Flanges 42, 44, 46, and 48 extend vertically a distance slightly beyond edges 34 and 36 and are connected at their outer ends to a pair of upper and lower flanges 52 and 54, respectively, that extend vertically outwardly from edges 30 and 32, respectively. A corresponding pair of upper and lower flanges 38 and 40, respectively, extends longitudinally outwardly from flanges 52 and 54, respectively, and is configured to be mounted to the interior of the ductwork of a building (not shown). Transverse flanges 42, 44, 46, and 48, and vertical flanges 38 and 40 are configured to form a seal against the inner periphery of the ductwork, f Referring also to FIG. 2, upper and lower damper blades 56 and 58, respectively, are disposed within void 50 and extend between the inner surfaces of side walls 23 and 24. Blades 56 and 58 extend horizontally when the damper assembly 20 is in the open position illustrated in claim 1 to enable air to flow through the damper assembly and circulate throughout the building. Blades 56 and 58 present upper surfaces 57 and 59, respectively, and lower surfaces 61 and 63, respectively, it being appreciated that the terms "upper" and "lower" are used herein to describe the blades when they are in the open position. Blades 56 and 58 define leading edges 60 that are disposed upstream of trailing edges 62 when the blades are open. Blades 56 and 58 have a longitudinal thickness that is sufficient to seal the void 50 with respect to airflow when the blades are closed (see FIG. 7). In particular, when the damper assembly 20 is closed, leading edge 60 of upper damper blade 56 is biased downwardly and trailing edge 62 of lower damper blade 58 is biased upwardly such that edges 60 and 62 abut each other to form a seal with respect to each other.

Figure 3:
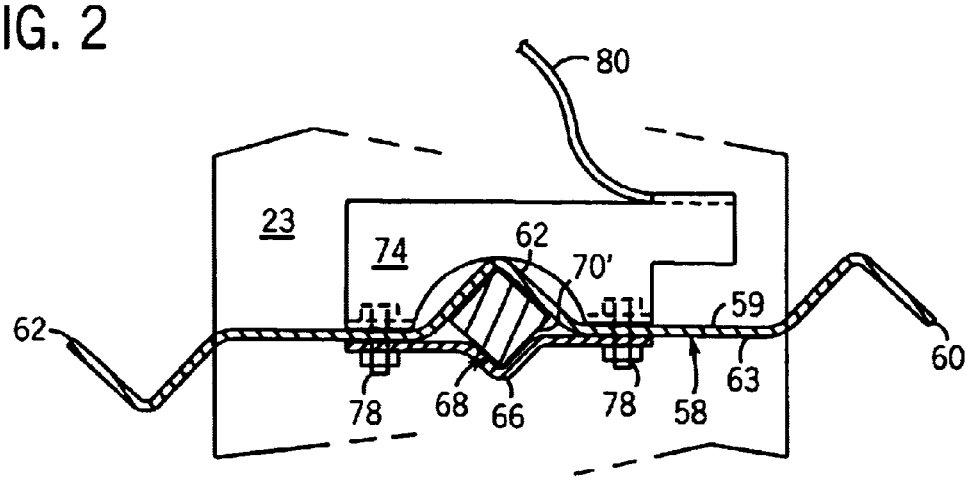
FIG. 3 is a sectional side elevation view of the lower damper blade illustrated in FIG. 2.

Referring also to FIG. 3, damper blades 56 and 58 present downwardly facing triangular grooves 67 that extend centrally along the transverse length of the blades. Grooves 67 define the axes of rotation for blades 56 and 58. A brackets 64 is mounted, preferably via rivets 65, onto the lower surface of each damper blade 56 and 58 at their corresponding transverse outer ends. Brackets 64 also define triangular grooves 66 that are upwardly facing and aligned with grooves 67 of blades 56 and 58 to define corresponding noncircular, and preferably rectangular, and more preferably square, bores 68. Bores 68 receive upper and lower noncircular shafts 70 and 70' which, in turn, are rotatably supported by side walls 23 and 24 (via a bearing or the like). Accordingly, both transverse ends of blades 56 and 58 are rotatably mounted to housing 22 to open and close the damper assembly 20.

Figure 2:
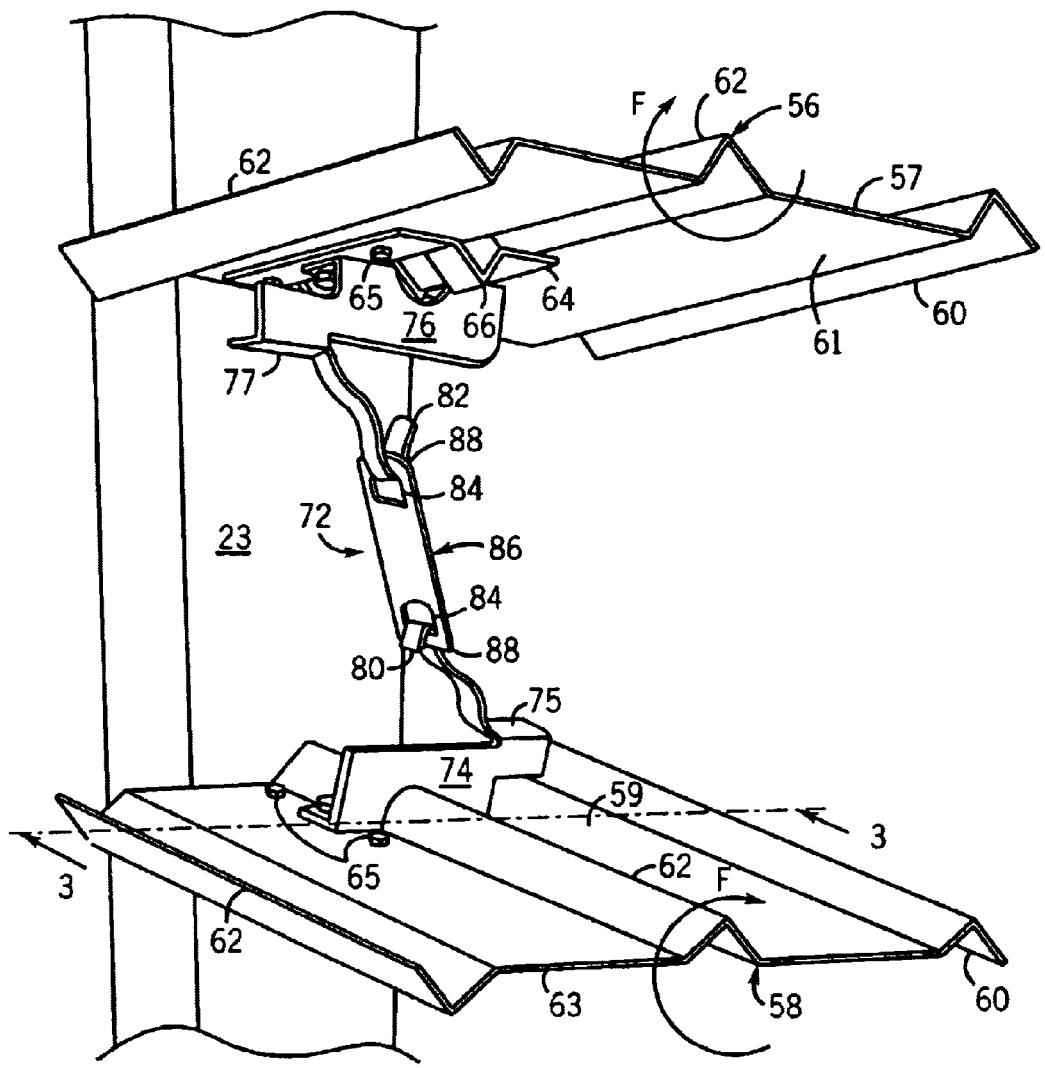
FIG. 2 is a perspective view of the damper blades of the damper assembly illustrated in FIG. 1.

Blades 56 and 58 are connected to a fusible link assembly 72 that includes a first housing 74 mounted onto the upper surface 59 of lower blade 58, and a second housing 76 mounted onto the lower surface 61 of upper blade 56. Housings 74 and 76 are mounted onto blades 56 and 58 on both longitudinal sides of grooves 67 via bolts 78. Housings 74 and 76 include hooks 80 and 82, respectively, that are, in turn connected to the outer ends 88 of a fusible link 86. In particular, hook 80 extends upwardly from one outer end 75 of housing 74, and in particular extends towards the opposite outer end 77 of housing 76. Hook 82 extends downwardly from outer end 77 of housing 76 towards outer end 75 of housing 74. Fusible link 86 defines apertures 84 extending through its outer ends 88 that are engaged by hooks 80 and 82. Fusible link 86 thus extends diagonally with respect to housings 74 and 76, and prevents blades 56 and 58 from rotating in response to a torsional force F (clockwise as illustrated in FIG. 2 and counterclockwise as illustrated in FIG. 1). It should be appreciated that the orientation of fusible link 86 could be reversed depending on the direction of force F.

Fusible link assembly 72 thus supports damper blades 56 and 58, and maintains damper assembly 20 in its open position to permit fluid to pass unobstructed through opening 50. However, when the fusible link 86 fails in a predetermined manner in response to a predetermined stimulus, damper blades 56 and 58 rotate to the closed position as illustrated in FIG. 7 to prevent fluid from traveling through damper assembly. Fusible link assembly 72 thus provides a removable mechanical connection between damper blades 56 and 58 that interferes with the blades' ability to close during normal operation. The present invention contemplates that fusible link assembly 72 can be heat responsive, or responsive to any other stimulus to fail in a predetermined manner.

Referring now to FIGS. 1 and 4 in particular, damper assembly 20 further includes a damper latch mechanism 21 that is mounted onto side wall 23, though it should be easily appreciated that mechanism 21 could be mounted at any suitable location. Latch mechanism 21 supports rotation of damper blades 56 and 58 and locks the damper blades 56 and 58 in position once the blades have been closed, thereby increasing the damper assembly 20 strength, as will now be described.

Latch mechanism 21 includes an upper rectangular pivot arm 90 that is pivotally mounted at a first outer end 92 to side wall 23. In particular, outer end 92 receives shaft 70, and is swaged or otherwise mechanically coupled to shaft 70, such that upper damper blade 56, shaft 70, and arm 90 rotate together. Upper pivot arm 90 extends upwardly and longitudinally forward from outer end 92 when damper blades 56 and 58 are open. Arm 90 is connected at a second outer end 96 to a linking member 98, which joins upper pivot arm 90 to a lower pivot plate 100. Linking member 98 extends vertically between arm 90 and pivot plate 100, and is disposed adjacent flange 42. Member 98 defines an upper end 97 that is pivotally connected to outer end 96 of upper pivot arm 90, and a lower end 99 that is pivotally connected to lower pivot plate 100. Plate 100 is pivotally mounted at its upper, longitudinally rearward, end through side wall 23 via shaft 70'. In particular, plate 100 receives shaft 70' in the manner described above with reference to pivot arm 90.

Lower pivot plate 100 includes a lip 108 that extends rearwardly from the longitudinally rear edge of pivot plate 100 at a location below shaft 70'. Lip 108 is connected to a first lower end 110 of a spring member 112 that extends upwardly and longitudinally rearward, and has an upper end 114 that is connected to flange 44 at a location above shaft 70'. It should be appreciated, however, that upper end 114 of spring can be positioned anywhere such that it biases the dampers towards their closed position. In this regard, the upper end 114 of the spring is said to be supported by (or in mechanical communication with) the housing 22, and the lower end 110 of spring is in mechanical communication with blades 56 and 58, and further in mechanical communication with plate 100. Accordingly, spring 112 imparts a torsional force F to lower pivot arm in the counterclockwise direction (with respect to the view taken in FIG. 4). The fusible link assembly 72 resists force F to prevent damper blades 56 and 58 from rotating, as described above.

Lower pivot plate 100 is connected to a locking member 116 interposed between side wall 23 and plate 100. In particular, locking member 116 is pivotally connected to the inner surface of the lower end of pivot plate 100 via a pin 118. Pin 118 is disposed below and upstream of shaft 70'. Locking member 116 includes a central body portion 120 and first and second arms 122 and 124, respectively. When locking member is in its neutral position (i.e., when damper blades 56 and 58 are open), first arm 122 extends upwardly and downstream from body portion 120 and second arm 124 extends downwardly and downstream from body portion 120. A hook 126 extends downwardly from the distal end of second arm 124. A vertically elongated groove 127 extends through flange 44 and defines a lower lip 129 that is substantially horizontally disposed with respect to shaft 70'. Hook 126 is configured to engage lip 129 when the damper blades 56 and 58 are closed.

A spring member 128 is connected at one end to the central body portion 120. The other end of spring 128 is connected to the longitudinal rearward end of lower pivot plate 100 at a location below shaft 70' and above pin 118. Spring member 128 is compressed, and extends primarily horizontally, and slightly vertically, when blades 56 and 58 are open.

The operation of damper assembly 20 will now be described with particular reference to FIGS. 4–7. During normal operating conditions illustrated in FIG. 4, fusible link assembly 72 prevents force F from rotating pivot arm 90 and plate 100 and corresponding damper blades 56 and 58 to their closed positions. Accordingly, blades 56 and 58 extend horizontally, thereby allowing the passage of air through opening 50. However, if the temperature of fusible link 86 becomes elevated beyond a maximum permissible threshold (well known in the art), the fusible link fails, thus removing the impediment to counterclockwise rotation under spring force F.

Because linking member 98 is pivotally mounted to the transverse outer surfaces of pivot arm 90 and pivot plate 100 at joints 104 and 106, respectively, rotation of lower pivot plate 100 in the direction of force F translates linking member 98 to correspondingly rotate upper pivot arm 90 which, in turn, rotates damper blades 56 and 58. Accordingly, referring now to FIG. 5, when fusible link 86 fails, spring force F biases lower pivot plate 100 in the counterclockwise direction, which translates linkage member 98 downwardly, thereby causing upper pivot arm 90 to rotate in the counterclockwise direction along with lower pivot plate 100. The rotation of pivot arm 90 and plate 100 causes shafts 70 and 70' along with corresponding damper blades 56 and 58 to rotate counterclockwise along the direction of Arrow A towards their closed position. As blades 56 and 58 rotate to their closed positions, pin 118 is translated primarily longitudinally downstream towards flange 44 and slightly downwardly while spring 128 remains compressed.

Referring to FIG. 6, as pivot plate 100 rotates counterclockwise, the outer edge of hook 126 contacts the transverse inner surface of flange 44. As pivot arm 100 continues to rotate counterclockwise, spring 128 is extended, and imparts a compressive spring force F2 that biases locking member 116 clockwise about pin 118. The interference between hook 126 and flange 44, however, prevents further clockwise rotation of locking member 116. However, as lower pivot plate 100 continues to rotate counterclockwise, pin 118 is translated downstream and upwardly, thereby causing arm 118 and hook 126 to correspondingly translate upwardly towards lower lip 129 of groove 127. It should be appreciated that spring force F2 continues to increase as lower pivot arm 100 continues to rotate counterclockwise with respect to locking member 116.

Referring now to FIG. 7, spring force F continues to rotate arms 100 and 90 along with damper blades 56 and 58 until the leading edge 60 of upper damper blade 56 engages the trailing edge 62 of lower damper blade 58, thereby closing the damper assembly 20 and preventing fluid from flowing through ductwork. The components of latch mechanism 21 are configured to enable hook 126 to engage groove 127 as blades 54 and 56 close. In particular, hook 126 slips over and catches lower lip 129 under clockwise spring force F2 which prevents hook 126 from becoming disengaged from the lower lip 129. If it becomes desirable to disengage hook 126 from lip 129 in order to reset the damper blades 56 and 58 in their open position, a user can manually rotate hook 126 counterclockwise away from lip 129.

The components of latch mechanism 21 are sized and configured such that hook 126 and lip 129 become engaged once blades 54 and 56 rotate to their fully closed position under spring force F. The interlock between hook 126 and lip 129 further maintains the closed position of blades 54 and 56 and strengthens the resulting seal. Additionally, spring force F2 biases locking member 116 clockwise which, in turn, maintains the interlock between hook 126 and lip 129. Damper assembly 20 thus provides enhanced strengthening features to prevent damper blades 54 and 56 from opening after fusible link 86 fails. The overall reliability of the damper assembly 20 is thus increased over conventional damper assemblies.

Advantageously, damper latch mechanism 21 is constructed to be installed integrally with damper assembly 20. In particular, referring to FIGS. 1 and 4, locking member 116 is attached to the lower pivot plate which is conventionally used during normal operation of a damper assembly. Spring 128 may then be connected from lower pivot arm 100 to locking member, and notch 127 may be formed in flange 44. Accordingly, the present invention includes the construction of damper assembly 20 along with the modification of a conventional damper assembly by installing damper latch mechanism 21 to maintain the damper blades 56 and 58 in their closed position upon failure of the fusible link. Furthermore, because locking member 116 is installed at a location transversely inwardly of lower pivot plate 100, damper latch mechanism 21 adds only minimal size to conventional damper assemblies.

Figure 8:
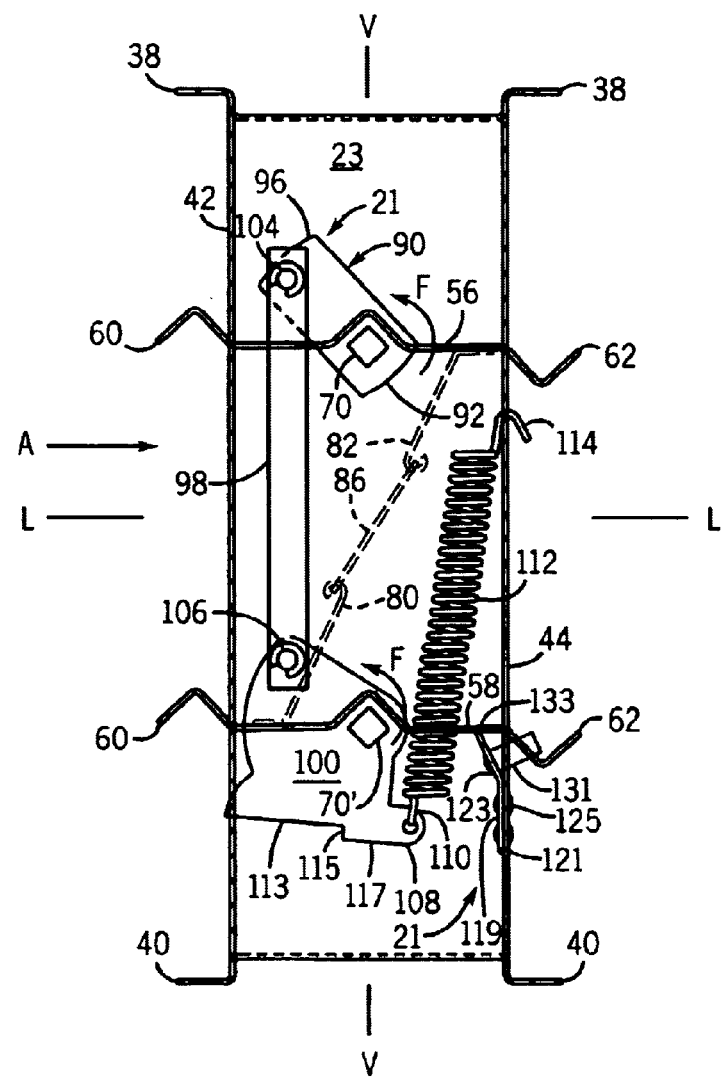
FIG. 8 is a sectional side elevation view of the damper assembly similar to that illustrated in FIG. 4, but having a coupling assembly constructed in accordance with an alternate embodiment of the invention.

It should be appreciated, however, that latch mechanism 21 as described above is only one possible configuration, and that the present invention is not intended to be limited to the latch mechanism described above. Rather, the present invention is intended to broadly cover any mechanism that prevents the damper blades from inadvertently opening once they have closed. For instance, referring now to FIG. 8, damper assembly 20 is illustrated similar to the assembly described above. However, the latch mechanism 21 is constructed in accordance with an alternate embodiment.

In particular, lower plate 100 defines a lower edge 113 that extends generally longitudinally when damper blades 56 and 58 are in the open position. A flange 115 extends outwardly from edge 113 that provides a catch for plate 100. Flange 115 connects to an outer edge 117 that provides the outer edge of lip 108. A plate 119, formed from steel or any other suitable material, includes a base 121 and a bent section 123 extending upwardly and upstream from the base. Base 121 is connected to flange 44 via rivets 125, or the like. A handle 131 extends generally downstream, and slightly upwardly, from bent section 123. Handle 131 extends through an opening (not shown) in flange 44, and thus extends outside the housing so as to be accessible to a user. Bent section 123 defines an outer edge 133 that provides a follower over outer edge 117, which provides a cam surface as will now be described.

During operation, when blades 56 and 58 are biased closed in the manner described above, plate 100 rotates counterclockwise under force F. As plate 100 rotates, lip 108 engages plate 119, thereby causing edge 133 to follow over cam surface 117. Lip 108 and plate 119 are sized and shaped such that, as blades 56 and 58 become fully closed, edge 133 snaps over flange 115. The interference between edge 133 and flange 115 locks plate 100 and blades 56 and 58 with respect to clockwise rotation. If it becomes desirable to reset damper blades 56 and 58 to their open position, a user can apply a downwards force to the exposed end of handle 131, thereby rotating edge 133 clockwise and removing edge 133 from engagement with flange 115.

The latch mechanisms 21 described above are only examples of a number of designs that are intended to fall within the scope of the present invention. For example, the present invention contemplates that a damper blade itself could provide a latch that catches on a member protruding from within the housing when the blade closes to prevent the blade from opening. Accordingly, unless otherwise noted, the present invention is intended to include any latch mechanism that engages to resist counter-movement of the damper blade towards the open position once the damper blade has closed. More specifically, the latch mechanism can include a latching member that is in mechanical communication with the housing or the damper blade, and a corresponding catch that is in mechanical communication with the damper blade or the housing, respectively, that creates a mechanical interference to resist counter-movement of the damper blade (s) towards the open position once the damper blade has closed.

One skilled in the art will appreciate that damper assemblies are available having a pair of damper blades, as described above, or alternatively with one damper blade that opens and closes to block the ductwork, or alternatively still with more than two damper blades that rotate in concert. The present invention recognizes that all such damper assemblies would benefit by the strengthening features of the present invention. The present invention is thus intended to encompass any damper assembly that can benefit by a locking member that becomes engaged when the damper blade(s) are closed to support the closed position of the damper assembly and resist the blades from opening.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A damper assembly installed in a housing having a pair of side walls connected to a pair of end walls that define a conduit extending therethrough, the damper assembly including at least one damper blade movable from an open position to a closed position to control fluid flow through the conduit, the damper assembly comprising:
    (a) the at least one damper blade operating in a normally open position;
    (b) a biasing member urging the damper blade towards the closed position;
    (c) a retaining member in removable mechanical communication with the damper blade to maintain the damper blade in the open position against the biasing force until an occurrence of a predetermined condition that causes the damper blade to close; and
    (d) a latch mechanism disposed outside the conduit, the latch mechanism including a plate connected to the damper blade and further connected to a locking member that pivots relative to the plate to lock the damper blade with respect to blade movement towards the open position once the damper blade has closed.

2. The damper assembly as recited in claim 1, wherein the retaining member is a fusible link.

3. The damper assembly as recited in claim 2, wherein the fusible link fails upon an occurrence of the predetermined condition to allow the biasing force to close the damper blade.

4. The damper assembly as recited in claim 1, wherein the retaining member is heat sensitive.

5. The damper assembly as recited in claim 1, wherein the locking mechanism carries a latch member that engages a catch member to lock the damper blade.

6. The damper assembly as recited in claim 5, wherein the catch member is formed in a housing wall.

7. The damper assembly as recited in claim 6, wherein the locking member further comprises a hook that engages the catch member.

8. The damper assembly as recited in claim 7, wherein the catch member is stationary.

9. The damper assembly as recited in claim 1, further comprising a spring member biasing the locking member into interference with a catch member that is supported by the housing.

10. The damper assembly as recited in claim 1, wherein the blade is rotatably coupled to a shaft that is connected to the plate.

11. The damper assembly as recited in claim 10, further comprising a second blade rotatably coupled to a second shaft that is, in turn, coupled to the plate.

12. The damper assembly as recited in claim 9, wherein a spring member is in mechanical communication with the blade at the first end, and in mechanical communication with the housing at a second end.

13. The damper assembly as recited in claim 12, wherein the spring is connected to the plate at one end, and to one of the side walls at the second end.

14. The damper assembly as recited in claim 1, wherein the damper blade rotates about an axis defined by a shaft that is connected to the plate.

15. The damper assembly as recited in claim 1, wherein the latch mechanism is mounted to an outer surface of the housing.

16. The damper assembly as recited in claim 1, wherein the biasing force is provided by a spring member operably connected between the blade and the housing.

17. The damper assembly as recited in claim 1, wherein the plate pivots about an axis and the locking member is connected to the plate at a location spaced from the axis.

18. A damper assembly installed in a housing having a pair of side walls connected to a pair of end walls that define a conduit extending therethrough, wherein the damper is movable from an open position to a closed position to control fluid flow through the conduit, the damper assembly comprising:
    (a) at least one damper blade operating in a normally open position;
    (b) a biasing member applying a force to the damper blade biasing the blade towards the closed position;
    (c) a retaining member in removable mechanical communication with the damper blade to maintain the damper blade in the open position against the biasing force until an occurrence of a predetermined condition; and
    (d) a latch mechanism including a plate coupled to the damper blade such that the plate pivots in response to blade rotation, the latch mechanism further including a locking mechanism pivotally connected to the plate that carries a latch member and causes the latch member to engage a catch member to resist movement of the damper blade towards the open position once the damper blade has closed, wherein one of the latch member and the catch member is stationary.

19. The damper assembly as recited in claim 18, wherein the retaining member is a fusible link.

20. The damper assembly as recited in claim 18, wherein the fusible link fails upon an occurrence of a predetermined condition, and wherein the biasing force closes the damper blade when the fusible link fails.

21. The damper assembly as recited in claim 18, wherein the retaining member is heat sensitive.

22. The damper assembly as recited in claim 18, further comprising a spring member that biases the latch member into interference with the catch member.

23. The damper assembly as recited in claim 22, wherein the plate pivots about an axis and the locking member is connected to the plate at a location spaced from the axis.

24. The damper assembly as recited in claim 23, wherein the axis is aligned with an axis of blade rotation.

25. The damper assembly as recited in claim 18, wherein the blade is rotatably coupled to a shaft that is connected to the plate.

26. The damper assembly as recited in claim 25, further comprising a second blade rotatably coupled to a second shaft that is, in turn, rotatably coupled to the plate.

27. The damper assembly as recited in claim 18, wherein the biasing member comprises a spring operably connected between the plate and the housing.

28. The damper assembly as recited in claim 27, wherein the spring is in mechanical communication with the plate at one end, and supported by the housing at a second end.

29. The damper assembly as recited in claim 28, wherein the spring is connected to the plate at one end, and to one of the side walls at a second end.

30. The damper assembly as recited in claim 18, wherein the damper blade rotates about an axis defined by a shaft that is connected to the plate.

31. The damper assembly as recited in claim 18, wherein the latch mechanism is mounted to an outer surface of the housing.

32. The damper assembly as recited in claim 18, further comprising a spring member that biases the latch mechanism toward a position causing the latch member to engage the catch member.

33. A method for operating a damper assembly of the type having at least one damper blade installed in a housing having a pair of side walls connected to a pair of end walls that define a conduit extending therethrough, wherein the blade is held in an open position by a retaining member:
    (A) causing the retaining member to fail;
    (B) biasing the blade to a closed position to block the conduit with respect to fluid flow; and
    (C) pivoting a plate that is connected to the damper blade from a first to a second position along with damper blade movement; and
    (D) engaging mating members by pivoting a locking member relative to the plate to which the locking member is connected in order to resist blade movement from the closed position towards the open position.

34. The method as recited in claim 33, wherein the retaining member is a heat-sensitive fusible link, and wherein step (A) further comprises breaking the fusible link.

35. The method as recited in claim 33, wherein step (D) further comprises engaging a latch member with a catch member.

36. The method as recited in claim 35, wherein step (C) further comprises pivoting the plate relative to the housing.

37. The method as recited in claim 36, wherein step (C) further comprises pivoting the plate along with the damper blade.

38. The method as recited in claim 36, wherein step (D) further comprises engaging the latch carried by the locking member to the catch formed in a housing wall.

39. The method as recited in claim 38, wherein step (D) further comprises engaging a latch carried by the locking member with a catch carried by the housing.

40. The method as recited in claim 39, wherein step (D) further comprises biasing the latch in engagement with the catch via a spring coupled between the plate and the locking member.

41. The method as recited in claim 36, wherein step (D) further comprises biasing the locking member toward a position whereby the latch member engages the catch member.

42. The method as recited in claim 33, wherein the damper assembly further comprises a spring operably connected between the plate and the locking member.

43. The method as recited in claim 33, wherein step (B) further comprises biasing the blade to the closed position via a spring coupled between the housing and the plate.

44. A latch assembly for a damper of the type that is installed in a housing defining an internal conduit and having a first blade and a second blade that can move in tandem from an open position whereby fluid is permitted to pass through the conduit, to a closed position whereby fluid flow through the conduit is restricted, the latch assembly comprising:
a first plate supported by the housing and coupled with the first blade; and
a second plate supported by the housing, coupled with the second blade, and further coupled with the first plate via a linkage supported by the housing at a location outside the conduit, the linkage being connected between the first and second plates outside the housing, wherein the second plate moves along with damper blade rotation and carries a locking member that pivots relative to the second plate to lock the damper blade with respect to blade movement towards the open position once the damper blade has closed.

45. The latch assembly as recited in claim 44, wherein locking member movement causes a latch member to engage a catch member.

46. The latch assembly as recited in claim 45, further comprising a spring member that biases the locking member towards a position that causes the latch to engage the catch.

47. The latch assembly as recited in claim 46, wherein the spring member is connected between the locking member and the second plate.

48. The latch assembly as recited in claim 46, wherein the latch is carried by the locking member.

49. The latch assembly as recited in claim 48, wherein the catch is carried by the housing.

50. The latch assembly as recited in claim 44, further comprising a spring member biasing the damper blades towards the closed position.

51. The latch assembly as recited in claim 44, wherein the spring member is connected between the second plate and the housing.

52. The latch assembly as recited in claim 44, further comprising a retaining member in removable mechanical communication with the damper blade to maintain the damper blade in the open position until an occurrence of a predetermined condition.

53. A damper assembly installed in a housing having a pair of side walls connected to a pair of end walls that define a conduit extending therethrough, wherein the damper is movable from an open position to a closed position to control fluid flow through the conduit, the damper assembly comprising:
(a) at least one damper blade operating in a normally open position;
(b) a biasing member applying a force to the damper blade biasing the blade towards the closed position;
(c) a retaining member in removable mechanical communication with the damper blade to maintain the damper blade in the open position against the biasing force until an occurrence of a predetermined condition; and
(d) a latch mechanism movably connected to the blade that causes a latch member and a catch member to engage to resist movement of the damper blade towards the open position once the damper blade has closed, the latch member being carried by the latch mechanism and the catch member being formed in a wall of the housing, wherein one of the latch member and the catch member is stationary.

54. A damper assembly installed in a housing having a pair of side walls connected to a pair of end walls that define a conduit extending therethrough, wherein the damper is movable from an open position to a closed position to control fluid flow through the conduit, the damper assembly comprising:
(a) at least one damper blade operating in a normally open position;
(b) a biasing member applying a force to the damper blade biasing the blade towards the closed position;
(c) a retaining member in removable mechanical communication with the damper blade to maintain the damper blade in the open position against the biasing force until an occurrence of a predetermined condition; and
(d) a latch mechanism that causes a latch member to engage a catch member, the catch member being formed in a housing wall.

55. The damper assembly as recited in claim 54, wherein the latch mechanism further comprises a plate connected to the damper blade that causes the latch member to engage the catch member when the damper blade is closed.

56. The damper assembly as recited in claim 55, further comprising a locking member that carries the latch member and is pivotally connected to the plate.

57. The damper assembly as recited in claim 56, wherein the locking member is biased into an engaged position via a spring connected between the locking member and the plate.

58. A damper assembly installed in a housing having a pair of side walls connected to a pair of end walls that define a conduit extending therethrough, the damper assembly movable from an open position to a closed position to control fluid flow through the conduit, the damper assembly comprising:
(a) at least one damper blade operating in a normally open position;
(b) a biasing member urging the damper blade towards the closed position;
(c) a retaining member in removable mechanical communication with the damper blade to maintain the damper blade in the open position against the biasing force until an occurrence of a predetermined condition that causes the damper blade to close; and
(d) a latch mechanism including a plate connected to the damper blade and further carrying a locking member that attaches to a catch member formed in a housing wall, the catch member being separate from the plate to resist movement of a damper blade towards the open position once the damper blade has closed, wherein the spring member, connected between the plate and the locking member, biases the locking member towards the engagement member.

59. The damper assembly as recited in claim 58, wherein the locking member carries a latch member that engages a catch member.

60. A damper assembly installed in a housing having a pair of side walls connected to a pair of end walls that define a conduit extending therethrough, the damper assembly movable from an open position to a closed position to control fluid flow through the conduit, the damper assembly comprising:
(a) at least one damper blade operating in a normally open position;

(b) a biasing member urging the damper blade towards the closed position;

(c) a retaining member in removable mechanical communication with the damper blade to maintain the damper blade in the open position against the biasing force until an occurrence of a predetermined condition that causes the damper blade to close;

(d) a latch mechanism disposed outside the conduit, the latch mechanism movably connected to the blade that causes mating members to engage and resist movement of the damper blade from the closed position towards the open position; and (e) a spring member biasing one of the mating members against the other mating member.

61. The damper assembly as recited in claim 60, wherein the latch mechanism further comprises a plate that rotates along with the damper blade to bring the mating members into engagement.

62. The damper assembly as recited in claim 61, wherein the plate carries a locking member that includes one of the mating members.

63. The damper assembly as recited in claim 62, wherein the spring is connected between the plate and the locking member.

64. The damper assembly as recited in claim 63, wherein the locking member carries a latch member that engages a catch member formed in a housing wall.

65. A latch assembly for a damper of the type that is installed in a housing and having a blade that can move from an open position whereby fluid is permitted to pass through the housing, to a closed position whereby fluid flow through the housing is restricted, the latch assembly comprising:

a plate supported by the housing and movably coupled with the blade from a first position to a second position, the plate carrying a first mating member; and a second mating member fixedly connected to the housing;

wherein plate movement to the second position interlocks the first and second mating members to resist blade movement from the closed position towards the open position.

66. The latch assembly as recited in claim 65, wherein the first mating member comprises a flange formed in the plate.

67. The latch assembly as recited in claim 66, wherein the second mating member flexes as it engages the flange.

68. The latch assembly as recited in claim 67, wherein the second mating member comprises a plate having a base connected to the housing and a bent section extending from the base, the bent section defining a distal end that engages the flange.

* * * * *